United States Patent Office 2,892,753
Patented June 30, 1959

2,892,753
CENTRAL NERVOUS SYSTEM STIMULANT

Ludwig Schmidt, Freiburg, Breisgau, and Heinz Scheffler, Biberach (Riss), Germany, assignors to C. H. Boehringer Sohn, Ingelheim (Rhine), Germany, a partnership of Germany No Drawing. Application February 26, 1957
Serial No. 642,333

17 Claims. (Cl. 167—65)

The present invention relates to a pharmaceutical composition and more particularly to a pharmaceutical composition having a stimulating effect on the central nervous system.

Caffeine and especially the so-called "arousal amines" which are derived from β-phenyl ethylamine, such as 1-phenyl-2-amino propane (amphetamine) or 1-phenyl-2-methylamino propane (methamphetamine) represent the most effective central nervous system stimulants known heretofore. These compounds, however, possess not only a central nervous system stimulating effect but also other pharmacological properties. For instance, they cause more or less pronounced rise in blood pressure and act as appetite depressants. Their most serious side-effect is the tendency of habit formation on continued use. In addition, when administering such "arousal amines," the patient becomes accustomed thereto after a comparatively short period of time and requires a progressively increased dose.

Therefore, the use of "arousal amines" is contraindicated in hypertonic and in psychically unstable patients in whom addiction-like habituation due to the euphoristic effects of such amines may occur. Prescription of such compounds is rendered difficult in a number of countries by laws and decrees because of their habit-forming effects.

Central nervous system stimulants, however, are rather widely employed in therapy, for instance, in the symptomatic treatment of mild psychogenic depressive states, particularly those attending childbirth, persistent pain, chronic organic disease, menopause, or old age, or those which are associated with morning tiredness, chronic fatigue, prolonged postoperative recovery or psychogenic bodily ailments, and in the treatment of many other pathological manifestations and conditions. Therefore, it is a long existing problem to supply the medical art with a central nervous system stimulant which does not possess the above indicated disadvantages and side-effects.

It is one object of the present invention to provide a pharmaceutical composition having a remarkable stimulating effect on the central nervous system and being substantially free of the objectionable side-effects of the heretofore used central nervous system stimulants. In contrast to such known central nervous system stimulating agents, the new pharmaceutical compositions, according to the present invention do not possess an euphoristic effect. Their administration, however, results in an unconscious increase in efficiency and functional capacity which can clearly and objectively be demonstrated in experiments with suitable persons by means of modern psychological test methods.

Another object of the present invention is to provide a new and effective method of stimulating the central nervous system in humans substantially without producing any undesirable side-effects.

Other objects of the present invention and advantageous features thereof will become apparent as the description proceeds.

In principle the present invention comprises pharmaceutical compositions containing, as active central nervous system stimulant, 5-phenyl-2-imino-4-oxo oxazolidine of the formula

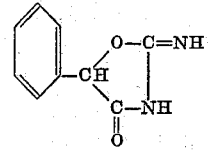

This compounds is a white, crystalline compound melting at 256–257° C. with decomposition. It is difficultly soluble in water and organic solvents. It is readily soluble in concentrated aqueous alkali hydroxide solutions and in concentrated aqueous mineral acids. It is preferably prepared by reacting mandelic acid ethyl ester with guanidine in boiling alcoholic solution whereby it is obtained as difficultly soluble precipitate with a yield of 90%.

Animal experiments show that 5-phenyl-2-imino-4-oxo oxazolidine has a remarkable energy increasing and stimulating effect on the central nervous system on oral as well as parenteral administration of only 5 mg./kg. Its stimulating effect persists for 5 to 24 hours, depending upon the dose administered.

Its effective dose was determined by administering to rats, each weighing 100 g. to 120 g., an aqueous suspension of various amounts of 5-phenyl-2-imino-4-oxo oxazolidine by means of the esophageal sound and subsequently placing the animals into vibrating cages. Administration of a high dose of 50 mg./kg. resulted in very strong motor stimulation which persisted for several days. On administration of 5 mg./kg. of 5-phenyl-2-imino-4-oxo oxazolidine onset of the stimulating effect was observed after about 45 minutes to 1 hour and stimulation lasted for 4 hours to 5 hours.

Similar tests were carried out with dogs, cats, and rabbits. The effective dose was also 5 mg./kg. Onset of the stimulating effect was observed with dogs and cats after 45 minutes to 1 hour and with rabbits after 15 minutes to 30 minutes. Stimulation lasted also for 4 hours to 5 hours.

Experiments carried out by one of the applicants and other persons confirmed this effect. The effective dose was between 5 mg. and 20 mg. The slow onset of activity within about 30 minutes was considered especially remarkable. The effect lasted for 2 hours to 5 hours, depending on the dose. Only insignificant motoric symptoms as they also resulted from administration of caffeine and 1-phenyl-2-methylamino propane hydrochloride, were observed. The stimulating effect on the psyche was gentle and the more pronounced, the stronger the fatigue was. No disagreeable side-effects were observed.

Comparative tests with caffeine, 1-phenyl-2-methylamino propane hydrochloride, α-phenyl-α-piperidyl-(2)-acetic acid methyl ester hydrochloride, and 2-phenyl-3-methyl tetrahydro-1,4-oxazine hydrochloride which were carried out with rats kept in vibrating cages show that 5-phenyl-2-imino-4-oxo oxazolidine has a central nervous system stimulating effect which is about 5 times as strong as that of caffeine. Its stimulating activity is between that of 1-phenyl-2-methylamino propane hydrochloride on the one hand and α-phenyl-α-piperidyl-(2)-acetic acid methyl ester hydrochloride and 2-phenyl-3-methyl tetrahydro-1,4-oxazine hydrochloride on the other hand.

In contrast to the "arousal amines," 5-phenyl-2-imino-4-oxo oxazolidine has the especially advantageous property that it does not only exert an energy increasing effect but also stimulates the appetite without affecting respiration, circulation, heart action, and intestinal functions.

5-phenyl-2-imino-4-oxo oxazolidine does not show any blood pressure decreasing effect in dogs or rats. It was administered in the form of an aqueous suspension which was stabilized by methyl cellulose (known to the trade as "Tylose SL400") or in the form of a solution in propylene glycol. The animals received, before administration of the new stimulating agent, 50 mg./kg. of "Numal Roche," i.e. of the diethylamine salt of isopropyl allyl barbituric acid. In these experiments administration of 5-phenyl-2-imino-4-oxo oxazolidine resulted in an insignificant stimulation of the respiration.

In further tests with dogs, cats, and rabbits arterial blood pressure, venous blood pressure, and respiration were recorded on administration into the duodenum of an aqueous suspension of 5-phenyl-2-imino-4-oxo oxazolidine. Even large doses of 500 mg./kg. did not affect arterial and venous blood pressure nor respiration.

In contrast thereto, 1-phenyl-2-methylamino propane exhibits in cats a strong and persistent pressor effect on intravenous injection of as small a dose as 0.05 mg./kg. as has been demonstrated by F. Hausschild in "Naunyn-Schmiedebergs Arch. exp. Pathol. Pharmacol.," vol. 191, page 471 (1939).

Tests were also carried out in order to determine the effect of 5-phenyl-2-imino-4-oxo oxazolidine upon the respiration of rabbits which was disturbed either by subcutaneous injection of 1 g./kg. of urethane followed by intravenous injection of 20 mg./kg. of morphine or by intravenous injection of 100 mg./kg. of morphine. The disturbances in respiration could considerably be improved in all animals by administration of an aqueous "Tylose" suspension of 5-phenyl-2-imino-4-oxo oxazolidine. In one third of the animals complete normalization of the respiration was achieved.

It was furthermore found that 5-phenyl-2-imino-4-oxo oxazolidine has a remarkable arousal effect. While peritoneal injection of 50 mg./kg. of "Numal" in rats produced narcosis lasting for about 6 hours, complete abolition of narcosis was achieved in 60% of the "Numal"-treated rats to which an aqueous suspension of 50 mg./kg. of 5-phenyl-2-imino-4-oxo oxazolidine was given by means of an esophageal sound and in an additional number of animals of 20% the narcosis lasted only half as long as without administration of said stimulating agent.

Other tests in which 5-phenyl-2-imino-4-oxo oxazolidine was administered before administration of "Numal" or in which first complete narcosis was produced by administration of "Numal" followed by administration of said stimulating compound confirmed this arousal effect.

Due to its excellent arousal effect an aqueous suspension of 5-phenyl-2-imino-4-oxo oxazolidine can be administered in cases of poisoning with barbituric acid derivatives or morphine following gastric lavage.

Furthermore, it has been found that daily administration even of a dose exceeding the required effective dose for a prolonged period of time does not cause habituation or addiction.

In addition thereto, 5-phenyl-2-imino-4-oxo oxazolidine has the further advantage of a remarkably low acute and chronic toxicity. Its $LD_{50}$ determined on rats, is 500 mg./kg. on oral administration. Thus, when taking a dose of 5 mg./kg. as the effective dose, the therapeutic index of 5-phenyl-2-imino-4-oxo oxazolidine is about 1:100. Giving dogs, cats or rabbits a single dose of 500 mg./kg. by means of an esophageal sound, resulted in a strong stimulating effect which persisted for days. Toxic side-effects, however, were not observed. In contrast thereto the lethal dose of 1-phenyl-2-methylamino propane is 70 mg./kg. on oral administration to rats as has been shown by F. Hausschild in "Naunyn-Schmiedebergs Arch. exp. Pathol. Pharmacol.," vol. 195, page 656 (1940).

Chronic toxicity tests were carried out with rats. They were given daily 100 mg./kg. of 5-phenyl-2-imino-4-oxo oxazolidine admixed to their feed for 3 months. Every week a blood picture was taken. No change in the blood picture during three months was observed. The animals were killed after three months. No pathological changes were found in the brain, heart, liver, kidneys, spleen, small and large intestines, testes, or ovaries.

In cases of exhaustion administration of 5-phenyl-2-imino-4-oxo oxazolidine rapidly results in a marked diminution of weariness, in a general increase in efficiency, and in an improved mood of the treated person.

5-phenyl-2-imino-4-oxo oxazolidine exerts a favorable therapeutic effect in schizoid conditions, depressive and obsessive-compulsive neurotic states and, thus, acts as mental drug.

In contrast to known central nervous system stimulants which usually have a bitter taste, 5-phenyl-2-imino-4-oxo oxazolidine is substantially tasteless and, therefore, can be taken without difficulty even by sensitive persons. The further advantage results from its tastelessness that compositions and preparations containing it can be aromatized so as to impart thereto any desired taste without having to accept any disagreeable aftertaste due to the bad taste of the active component.

For therapeutical administration 5-phenyl-2-imino-4-oxo oxazolidine is incorporated into pharmaceutical excipients and is used, for instance, in the form of tablets, dragees, capsules, suppositories, liquids to be administered in drops, emulsions, suspensions, sirups, chocolate, candy, chewing gum, and the like. Such compositions and preparations contain at least 0.1% of the active ingredient. Its percentage in the compositions and preparations may, of course, be varied and may be between about 2% and about 60% of the weight of the unit. To use greater amounts is, of course, also possible although administration of a suitable dosage becomes more difficult. The amount of active ingredient in such therapeutically useful compositions or preparations is such that a suitable dosage will be obtained. Preferred compositions or preparations according to the present invention are prepared in such a manner that a dosage unit form contains between about 4 mg. and about 100 mg. of 5-phenyl-2-imino-4-oxo oxazolidine.

The following examples serve to illustrate the preparation of pharmaceutical compositions according to the present invention without, however, being limited thereto.

Example 1

|   | G. |
|---|---|
| 5-phenyl-2-imino-4-oxo oxazolidine | 2.0 |
| Potato starch | 10.0 |
| Talc | 2.0 |
| Lactose | 85.0 |
| Magnesium stearate | 1.0 |

The active compound, the excipients, and one-half of the magnesium stearate are intimately mixed until a homogeneous mixture is obtained which is compressed into large slugs that are broken up into granules by forced screening through a 10 mesh screen. The remaining magnesium stearate is admixed thereto and the granules are compressed to tablets of 250 mg., each tablet containing 5.0 mg. of 5-phenyl-2-imino-4-oxo oxazolidine.

Example 2

|   | G. |
|---|---|
| 5-phenyl-2-imino-4-oxo oxazolidine | 5.0 |
| Corn starch | 15.0 |
| Lactose | 29.0 |
| Stearic acid | 1.0 |
| Sugar coating | 50.0 |

The active compound, corn starch, and lactose are intimately mixed and granulated with the required amount of water. Stearic acid is admixed to said granules and the mixture is tableted and then coated with sugar coating. The mixture yields dragees of 300 mg. Each dragee contains about 15 mg. of 5-phenyl-2-imino-4-oxo oxazolidine.

Example 3

| | G. |
|---|---|
| 5-phenyl-2-imino-4-oxo oxazolidine | 4.0 |
| Corn starch | 10.0 |
| Lactose | 83.0 |
| Magnesium stearate | 3.0 |

The ingredients are intimately mixed and ground and the mixture is filled in wafer capsules, each containing 250 mg. thereof, i.e. 10 mg. of 5-phenyl-2-imino-4-oxo oxazolidine.

Example 4

| | G. |
|---|---|
| 5-phenyl-2-imino-4-oxo oxazolidine | 10.0 |
| Potato starch | 15.0 |
| Talc | 2.0 |
| Lactose | 73.0 |

The ingredients are intimately mixed and ground. 250 mg. of the resulting powder are filled into each half of a gelatine capsule. The other half is then fitted over the filled half capsule to yield a gelatine capsule containing 25 mg. of 5-phenyl-2-imino-4-oxo oxazolidine.

Example 5

Suppositories, each weighing about 2.0 g., are prepared from a mixture of

| | G. |
|---|---|
| Cocoa butter | 96.0 |
| Lactose | 3.0 |
| 5-phenyl-2-imino-4-oxo oxazolidine | 1.0 |

Each suppository contains about 20 mg. of 5-phenyl-2-imino-4-oxo oxazolidine.

Example 6

A solution to be administered dropwise is prepared from

| | G. |
|---|---|
| Glycerol | 40.0 |
| Polyoxyethylene sorbitan monolaurate | 3.0 |
| Ethanol 96% | 56.0 |
| 5-phenyl-2-imino-4-oxo oxazolidine | 1.0 |

The active ingredient is dissolved in the mixture of the other ingredients while heating. 1 cc. of the resulting solution containing 10 mg. of 5-phenyl-2-imino-4-oxo oxazolidine is administered as a single dose.

Example 7

| | G. |
|---|---|
| 5-phenyl-2-imino-4-oxo oxazolidine | 0.2 |
| are incorporated in a sirup made from | |
| Ethanol 96% | 1.0 |
| Glycerol | 10.0 |
| Sugar | 30.0 |
| and | |
| Water | 59.0 |
| p-Hydroxy benzoic acid methyl ester | 0.05 |
| and | |
| p-Hydroxy benzoic acid propyl ester | 0.05 | are added thereto as preserving agent. The single dose administered is 20 cc. containing 40 mg. of 5-phenyl-2-imino-4-oxo oxazolidine.

Example 8

| | G. |
|---|---|
| 5-phenyl-2-imino-4-oxo oxazolidine | 0.1 |
| are incorporated in a sirup prepared from | |
| Glycerol | 20.0 |
| Ethanol 96% | 10.0 |
| Sugar | 30.0 |
| and | |
| Water | 40.0 |

The single dose administered is 20 cc. containing 20 mg. of 5-phenyl-2-imino-4-oxo oxazolidine.

Example 9

An emulsion is prepared by triturating

| | G. |
|---|---|
| 5-phenyl-2-imino-4-oxo oxazolidine | 0.05 |
| with | |
| Tragacanth | 1.0 |
| Gum arabic | 15.0 |
| and | |
| Water | 44.0 |

The resulting mixture is emulsified with the addition of

| | G. |
|---|---|
| Saccharin sodium | 0.01 |
| and | |
| Peanut oil | 40.0 |

Flavoring substances are added to the resulting emulsion as desired. The single dose administered is 20 cc. containing 10 mg. of 5-phenyl-2-imino-4-oxo oxazolidine.

Example 10

An injectable oily suspension is prepared by suspending

| | G. |
|---|---|
| 5-phenyl-2-imino-4-oxo oxazolidine in finely divided form | 1.0 |
| in | |
| Sesame oil | 99.0 |

The suspension is filled into ampoules of 2 cc., each containing 20 mg. of 5-phenyl-2-imino-4-oxo oxazolidine.

Example 11

Candy is prepared by incorporating

| | G. |
|---|---|
| 5-phenyl-2-imino-4-oxo oxazolidine | 0.2 |
| in | |
| Candy base | 100.0 |

The candy base may be composed, for instance, of

66% by weight of refined sugar in crystals,
38% by weight of 60% sugar sirup,
0.8% by weight of citric acid, and
0.2% by weight of lemon oil.

Candy pieces of 2.0 g., each containing about 4 mg. of 5-phenyl-2-imino-4-oxo oxazolidine, are made therefrom.

Example 12

Chocolate is prepared by incorporating

| | G. |
|---|---|
| 5-phenyl-2-imino-4-oxo oxazolidine | 0.5 |
| in | |
| Chocolate base | 100.0 |

The chocolate base may be composed, for instance, of

24% by weight of cocoa powder,
50% by weight of powdered sugar, and
26% by weight of cocoa butter or peanut fat.

The resulting chocolate is subdivided in pieces of about 4 g., each containing 20 mg. of 5-phenyl-2-imino-4-oxo oxazolidine.

Example 13

Chewing gum is prepared by incorporating

| | G. |
|---|---|
| 5-phenyl-2-imino-4-oxo oxazolidine | 2.0 |
| in | |
| Chewing gum base | 98.0 |

The chewing gum base may be composed, for instance, of

20% by weight of chicle gum,
15% by weight of glucose sirup 45° Baume,
64% by weight of powdered sugar, and
1% by weight of aromatizing agent.

Chewing gums of 1.0 g. representing a single dose are made therefrom. Each chewing gum contains 20 mg. of 5-phenyl-2-imino-4-oxo oxazolidine.

In place of the excipients given in the preceding examples, there may, of course, be used other excipients. For instance, when preparing tablets, pills, dragees, and the like shaped solid preparations for oral administration, the commonly used diluting agents, binders, lubricants, and the like tableting adjuvants are employed, such a sugar, dextrose, lactose, starch, methyl cellulose, yeast extract, agar, tragacanth, and as lubricants, stearic acid, magnesium stearate, calcium stearate, and others.

Preparations and compositions containing 5-phenyl-2-imino-4-oxo oxazolidine have proved to be useful in the treatment of certain depressive conditions, especially those characterized by apathy and psychomotor retardation, in the symptomatic treatment of many psychogenic depressive states, narcolepsy, postencephalitic parkinsonism, nausea of pregnancy, children's behavior disorders, as an adjunct in the treatment of alcoholism, and in the treatment of other pathological conditions as pointed out hereinabove. It is also of value as an analeptic in the treatment of poisoning by central depressants.

The effective dosage may be varied with the individual patient and with the conditions to be treated. The initial dose is preferably 5 mg. or less and should be gradually increased until a definite effect appears. The use of a small initial test dose is of importance in the treatment of depressive states. To avoid interference with sleep, the final daily dose should ordinarily be given not later than 4 p.m. The usual therapeutic dose is between 10 mg. and 50 mg. although larger doses might also be given, if required. Such a dose may be given two to three times daily in intervals of 3 hours to 6 hours.

We claim:

1. A composition having a stimulating effect upon the central nervous system and being substantially free of undesired side-effects, said composition comprising, as central nervous system stimulating ingredient, not less than 0.1% of 5-phenyl-2-imino-4-oxo oxazolidine and a significant amount of a pharmaceutical carrier.

2. A composition having a stiumlating effect upon the central nervous system and being substantially free of undesired side-effects, said composition comprising, as central nervous system stimulating ingredient, between about 2% and about 60% of 5-phenyl-2-imino-4-oxo oxazolidine and a significant amount of a pharmaceutical carrier.

3. A composition having a stimulating effect upon the central nervous system and being susbtantially free of undesired side-effects, said composition comprising, as central nervous system stimulating ingredient, not less than 0.1% of 5-phenyl-2-imino-4-oxo oxazolidine and a significant amount of a solid pharmaceutical carrier.

4. A composition in dosage unit form having a stimulating effect upon the central nervous system and being substantially free of undesired side-effects, said composition comprising, as central nervous system stimulating agent, not less than 4 mg. of 5-phenyl-2-imino-4-oxo oxazolidine per dosage unit and a significant amount of a pharmaceutical carrier.

5. A composition in dosage unit form having a stimulating effect upon the central nervous system and being substantially free of undesired side-effects, said composition comprising, as central nervous system stimulating agent, between about 4 mg. and about 100 mg. of 5-phenyl-2-imino-4-oxo oxazolidine per dosage unit and a solid pharmaceutical carrier.

6. A composition in tablet dosage unit form having a stimulating effect upon the central nervous system and being substantially free of undesired side-effects, said composition comprising, as central nervous system stimulating agent, between about 4 mg. and about 100 mg. of 5-phenyl-2-imino-4-oxo oxazolidine per dosage unit and a solid pharmaceutical carrier.

7. A composition according to claim 6 in which the solid pharmaceutical carrier comprises at least one member selected from the group consisting of lactose, starch, talc, and stearic acid.

8. A liquid pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine dissolved in a significant amount of a physiologically indifferent organic solvent tolerated by the human body.

9. A liquid pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine dissolved in a significant amount of a mixture of glycerol and ethanol.

10. A suppository composition having a stimulating effect upon the central nervous system and being substantially free of undesired side-effects, said composition comprising, as central nervous system stimulating agent, not less than 0.1% of 5-phenyl-2-imino-4-oxo oxazolidine incorporated into a suppository base.

11. A liquid pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine incorporated into a sugar sirup.

12. An injectable pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine finely and uniformly suspended in an injectable vegetable oil.

13. A pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine incorporated into a candy base.

14. A pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine incorporated into a chocolate base.

15. A pharmaceutical composition having a stimulating effect upon the central nervous system and being substantially free of undesired side-effects, said composition comprising, as central nervous system stimulating agent, not less than 0.1% of 5-phenyl-2-imino-4-oxo oxazolidine incorporated into a chewing gum base.

16. A process of stimulating the central nervous system of human beings substantially without causing undesired side-effects, which process comprises administering a composition comprising not less than 0.1% of 5-phenyl-2-imino-4-oxo oxazolidine to a human being requiring stimulation of the central nervous system.

17. A process of treating psychogenic depressive conditions in human beings substantially without causing undesired side-effects, which process comprises administering to such human beings an initial single dose of about 5 mg. of 5-phenyl-2-imino-4-oxo oxazolidine, repeating such administration two to three times daily, and gradually increasing said initial dose to the dose whereby relieving of the depressive condition is achieved.

No references cited.